(No Model.)

F. M. SNOOK.
ICE CREAM FREEZER.

No. 597,918. Patented Jan. 25, 1898.

WITNESSES
Sherwood R. Taylor
N. G. Edwards

INVENTOR
Frank M. Snook,
by Arthur Stem,
His Atty.

UNITED STATES PATENT OFFICE.

FRANK M. SNOOK, OF CINCINNATI, OHIO.

ICE-CREAM FREEZER.

SPECIFICATION forming part of Letters Patent No. 597,918, dated January 25, 1898.

Application filed February 6, 1897. Serial No. 622,305. (No model.)

*To all whom it may concern:*

Be it known that I, FRANK M. SNOOK, a citizen of the United States, residing at Cincinnati, in the county of Hamilton and State of Ohio, have invented certain new and useful Improvements in Ice-Cream Freezers, of which the following is a full, clear, and exact description, reference being had to the accompanying drawings, forming part of this specification.

My invention relates to an improvement in ice-cream freezers of the usual class in which the vessel containing the cream to be frozen is placed in a proper receptacle surrounded by ice and containing a beater or stirrer and scraper for keeping the cream stirred up.

It consists in novel features relating to the arrangement and construction of the gearing for revolving the vessel containing the cream and also of the dasher.

Figures 1, 2:
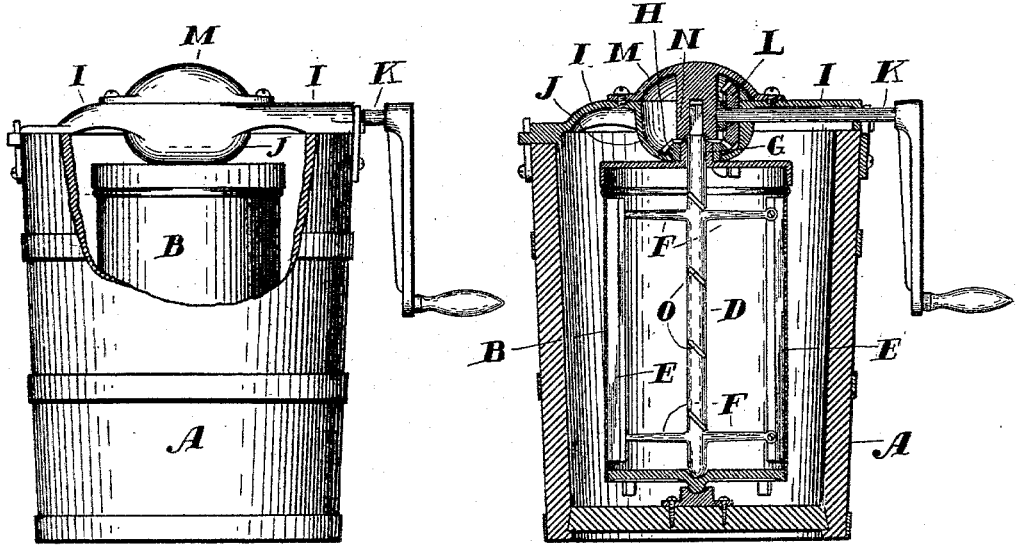
Figures 3, 4:
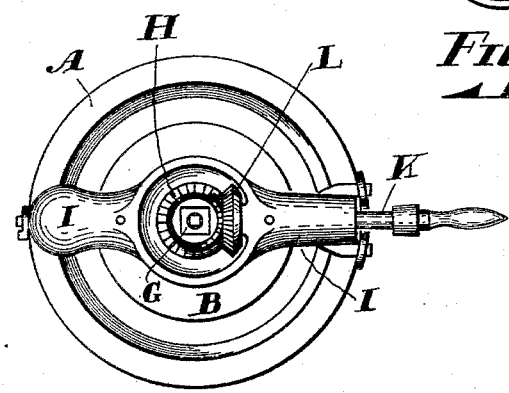
Figure 5:
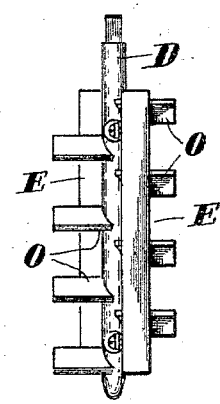

In the drawings, Figure 1 represents a side elevation, partly cut away. Fig. 2 represents a vertical section of the same; Fig. 3, a top plan view with the cap removed to show the gearing. Fig. 4 is a bottom view of the cap fitted over and covering the gearing. Fig. 5 is a side elevation of the beater and scraper, and Fig. 6 a top view of the same.

A is an ordinary tub or bucket, and B a metal vessel, which is preferably pivotally mounted within this tub A, with sufficient space between their walls for proper amount of ice for refrigerating the contents of B.

D is a dasher or beater extending upwardly in the center of the vessel B and provided with scrapers E, preferably made of wood and swiveled to horizontal arms F F, so arranged that when turned in one direction the sharp edge will be thrown against the inner wall of the vessel B and scrape its surface, removing the slight layer of cream frozen to it and throwing the same toward the center of the vessel B.

I prefer to construct the gearing so that the dasher D is held stationary and the can B is revolved. The top or lid of the can B is provided at its center with a square or angular boss G. Fitting around this boss G is a beveled pinion H, which when revolved will revolve the can B, the top of said can being arranged so that it will not turn upon the can and can be made arched instead of flat, as shown.

Removably attached to the top of the tub A is an arm I, extending horizontally across the top of the tub and held in place in any of the usual and familiar ways. At the center of this casting I is a cup-shaped portion J, with a central opening in its bottom, and the lower edges around this opening pass under and support the beveled pinion H, forming bearings for it. The beveled pinion H rests loosely in its bearings formed by the circular edges of this opening in the bottom of the cup J and is free to revolve. In one side of the arm I are provided bearings for a crank-rod K, on the inner end of which and extending down within the cup J is a beveled gear L, which meshes with the pinion H and revolves it when the crank is turned. Over the gearing and screwed to the arm I is a cap M, having in its center a downwardly-extending sleeve N, in which is a square opening or angular opening to receive the top or upper end of the axis of the dasher D, and thus hold the dasher stationary and prevent its revolving. The hub of the beveled gear L is extended out, so as to bear against the sleeve N, this gear L being screwed on the rod K, thus preventing the rod K from moving laterally and holding it securely in place. This cap M is constructed to cover completely the cup containing the beveled pinion and the beveled gear, which are thereby completely and entirely inclosed, as shown in Fig. 1. By turning the crank the beveled pinion H is revolved, and with it the can B, the dasher D remaining stationary. The boss G extending up into the cup-shaped casting J, preferably above the edge of the pinion H, any oil that may be used for lubricating the gearings will pass down outside of the boss G and cannot find any access to the interior of the can B. All the gearing and working parts being thus inclosed, the can B being once in place in the tub A ice may be shoveled into the tub without any care or danger of the salt or water going into the inside of the vessel B. The pinion H, having its bearings in the circular opening in the bottom of the shell J, and both it and the gear L being inclosed within this shell, will not bind, but will work freely even when the arm I is moved, so that the shaft D of the dasher is not perfectly perpendicular, but will permit of a very considerable variation in the angle or setting of the can and shaft D of the dasher. The end of the arm I, extending across the top of the tub opposite the end to which the crank is attached, may be moved upward or to either side a considerable distance without affecting in any way the operation of the pinion and gearing, which are completely inclosed and held in mesh with each regardless of the position of the casing or cup J and cap M, so that the accuracy in adjustment between the can-top and the shaft of the dasher usually required is not at all needed in this construction.

I am aware that it is not new in a dasher of an ice-cream freezer provided both with vertical scrapers E and fins or stirrers O, but they are usually made in the same plane.

Figure 6:
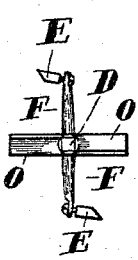

In operation the contents of the vessel B will of course freeze first and quickest at the outside edges with which the ice comes in contact, and if this film or coating of frozen cream is not removed it will very soon form a wall virtually insulating the center and preventing the refrigerating effect of the ice on the outside, at least making the operation so very slow as to be impracticable. The object of the scrapers E is to scrape off this film or coating and throw it to the center, and to insure a close contact between the scrapers E and the walls of the can the outer ends of the arms F are bent slightly backward, as shown in Fig. 6, so that the resistance caused by the contents of the can will force the edges against the walls. The object of the fin-shaped beaters C is the reverse—that is, to throw the contents of the vessel B from the center against the walls. In my improvement these beaters or stirrers O are attached to the main shaft at right angles to the plane of the scrapers, which consequently makes them a quarter of a circle away from the scrapers E. These fins or stirrers are placed on opposite sides of the shaft D at alternating distances—that is, the fins on one side coming midway between the points of connection of the fins on the opposite side of the shaft D. These fins are placed at an incline—that is, the face or broad surface has a perpendicular slope—so that when the can is revolved the forward end of the fins—that is, the end which is forward as relating to the revolving contents in the can—is below the plane of the rear end of the fins, as clearly shown in Fig. 5. By this means there remains an open space between the scraper E and the axis of the dasher for the free passage of the frozen cream scraped from the walls, while the stirrers O follow a quarter of a circle back, throwing out the contents from the center. If these stirrers O were in the same plane and parallel with the arms carrying the scrapers E, they would operate to a certain extent against the action of the scrapers to defeat it. They would fill up the space between the scrapers and the axis instead of leaving it free for the backward passage of the frozen cream scraped by it, whereas by arranging them as described the action of each is greatly facilitated, and much more perfect and quick results are secured.

Having thus described my invention, what I claim, and desire to secure by Letters Patent, is—

1. In an ice-cream freezer, the beveled pinion having its bearings in a circular opening of a shell-shaped casting attached to the walls of the tub, said pinion meshing with a beveled gear attached to a crank-shaft and fitting upon a boss on the top of the vessel containing the cream to revolve the same, substantially as and for the purpose described.

2. In an ice-cream freezer, a beveled pinion having its bearings in the lower side of a shell-shaped casting in the manner described and fitting a boss on the top of the vessel to be rotated, in combination with a cap inclosing the gearing and provided with a sleeve for holding the axis of the dasher stationary, substantially as and for the purpose described.

3. The dasher of an ice-cream freezer having vertical scrapers attached to an axis with outer ends of the carrying-arms turned slightly backward and a series of inclined beaters or stirrers attached to the same axis in a plane at right angles to the plane of the scrapers, substantially as and for the purpose described.

4. The dasher of an ice-cream freezer having beveled vertical scrapers attached to an axis with outer ends of the carrying-arms turned slightly backward, and a series of horizontally-disposed and oppositely-inclined beaters or stirrers attached alternately on opposite sides of the same axis in a plane at right angles to the plane of the scrapers, substantially as and for the purpose described.

5. The dasher of an ice-cream freezer provided with carrying-arms turned slightly backward and vertical scrapers pivoted thereto to bear against the sides of the can in combination with a series of beaters to drive the contents centrifugally whereby a constant action may be had by the scrapers to prevent contact of the frozen cream with the can, substantially as and for the purpose described.

FRANK M. SNOOK.

Witnesses:
GEORGE HEIDMAN,
HARVEY EDWARDS.